United States Patent
Gurevich et al.

(10) Patent No.: US 10,395,200 B2
(45) Date of Patent: Aug. 27, 2019

(54) METHOD AND APPARATUS FOR REPAIRING POLICIES

(71) Applicant: CA, Inc., New York, NY (US)

(72) Inventors: Mikhail Gurevich, Newton Center, MA (US); Stephan Erickson, Shrewsbury, MA (US); William Cohen, Wayland, MA (US); Uzi Cohen, Shrewsbury, MA (US)

(73) Assignee: CA, Inc., New York, NY (US)

(*) Notice: Subject to any disclaimer, the term of this patent is extended or adjusted under 35 U.S.C. 154(b) by 641 days.

(21) Appl. No.: 15/073,104

(22) Filed: Mar. 17, 2016

(65) Prior Publication Data

US 2017/0270438 A1 Sep. 21, 2017

(51) Int. Cl.
G06Q 10/06 (2012.01)
G06F 17/30 (2006.01)
G06F 16/18 (2019.01)
G06F 16/23 (2019.01)

(52) U.S. Cl.
CPC ............... *G06Q 10/0633* (2013.01)

(58) Field of Classification Search
CPC ........ G06Q 10/06; G06Q 30/01; G06F 17/30; G06F 16/18; G06F 16/23
USPC ...................................... 705/7.27
See application file for complete search history.

(56) References Cited

U.S. PATENT DOCUMENTS

| 9,940,182 | B1* | 4/2018 | Stott | G06Q 30/018 |
| 2005/0278431 | A1* | 12/2005 | Goldschmidt | H04L 41/0869 709/207 |
| 2010/0293407 | A1* | 11/2010 | Locasto | G06F 11/3672 714/2 |
| 2011/0010543 | A1* | 1/2011 | Schmidt | H04W 12/10 713/168 |
| 2012/0036220 | A1* | 2/2012 | Dare | G06F 8/61 709/217 |
| 2012/0036552 | A1* | 2/2012 | Dare | H04L 41/0253 726/1 |
| 2012/0290870 | A1* | 11/2012 | Shah | G06F 21/10 714/4.11 |
| 2013/0042115 | A1* | 2/2013 | Sweet | H04L 63/0428 713/176 |
| 2015/0237502 | A1* | 8/2015 | Schmidt | H04W 12/10 726/7 |
| 2016/0110406 | A1* | 4/2016 | Zircher | G06F 16/2365 707/690 |
| 2016/0299937 | A1* | 10/2016 | Crockett | G06F 16/1873 |

* cited by examiner

Primary Examiner — Nga B Nguyen
(74) Attorney, Agent, or Firm — Meyertons, Hood, Kivlin, Kowert & Goetzel, P.C.

(57) ABSTRACT

A control computer implements a multi-stage process to automatically repair errors in a policy using selectable, pluggable repair modules. In the first stage, the control computer identifies the errors that caused the policies to fail the validation process, and associates the errors with corresponding repair modules. The repair modules comprise information that is needed to correct or repair the errors. In the second stage, the control computer generates commands for correcting the errors based on the information in the repair modules. In a third stage, the control computer applies the commands to the policies that failed the validation process to correct the errors.

18 Claims, 7 Drawing Sheets

```
class RepairModuleFactory
{
public:
virtual RepairModule* create() const = 0;    // create the specific Repair Module instance.
virtual const char* getDescription() const = 0; // returns a id of the RepairModuleFactory.
virtual bool canRepair(ErrorObject) = 0; // return true if the passed error object can be repaired by this
                                         // repair module
protected
RepairModuleFactory()     //class constructor
{
  registerRepairModule(this); // constructor registers this with the XPSRepairManager whenever factory is created
  }
};
```

FIG. 3A

```
class RepairModuleFactoryForMsgId : public RepairModuleFactory
{
virtual bool canRepair(ErrorObject);
const char* m_id;
const IXPSDDAttribute* m_attr;
const IXPSDDClass* m_BaseClass;
const IXPSDDClass* m_LinkClass;
};
```

FIG. 3B

```
// class XPSChangeSet contains instructions needed to be executed to repair the Policy Store
class XPSChangeSet
{
    // add repair instructions (Change) to changeset. Called by RepairModule.doDefaultRepair()
    virtual void addChange(Change) = 0;

// repair Policy Store: apply ChangeSet to PolicyStore
    virtual void apply( ) = 0;
};
```

FIG. 3C

```
class RepairModule
{
    // check if given module can fix given error
    virtual bool canRepair(ErrorObject) = 0;

// get description of the fix for the error report
    virtual void getDescription(ErrorObject, ErrorReport) const = 0;

// generate repair instructions (ChangeSet) to fix this error. Does
    // Does not actually change the policy store.
    // Policy Store s changed (repaired) by calling ChangeSet.apply
    virtual bool doDefaultRepair(ErrorObject, XPSChangeSet& ) = 0;
};
```

FIG. 3D

METHOD AND APPARATUS FOR REPAIRING POLICIES

BACKGROUND

The present disclosure relates generally to policy validation processes, and more particularly to devices and methods for correcting policies that fail such validation processes.

Policies are a set of organized rules, procedures, and protocols associated with the operations of a computing device, as well as the network to which the device connects. There are many different types of policies, such as user policies, security polices, and routing polices, for example, but they generally exist as computer files having a definite structure or schema, and are implemented to control and organize the operations of the computing device and/or network.

Policies may change over time; however, many companies have strict procedures for effecting policy changes. Conventionally, policies are first changed under a controlled test environment, such as in a lab, and then tested. Provided the tests are successful, the modified policies are put into a production environment. However, the process for requesting approval to change a policy, and for receiving approval to effect that change, can be time consuming. Further, conventional methods for changing policies require manual approval from a supervisor or administrator.

BRIEF SUMMARY

The present disclosure provides a computing device and corresponding computer-implemented method for repairing policies that fail a validation process. More particularly, embodiments of the present disclosure implement a multi-stage process to automatically repair a given set of policies using one or more repair modules. The repair modules are stored in a pool, "store," or collection of repair modules, and comprise repair information that is needed to correct or repair the various errors that cause the policies to fail validation.

In a first stage, the errors that caused the policies to fail the validation process are identified and associated with a repair module selected from the pool of repair modules. The repair modules are selected based on the errors. In a second stage, a set of commands are generated to repair the errors using the repair information in the selected repair modules. The commands comprise instructions, and in some cases, data, that defines how the detected errors are to be resolved. In the third stage, the set of commands and/or data is applied to the policies that failed validation to correct the errors that caused the validation failure.

In one embodiment, a computer-implemented method calls for validating a plurality of stored policies, each policy comprising information associated with operating a computing device. For each policy that fails validation, the method calls for generating a list of one or more errors that caused the policy to fail validation, selecting one or more repair modules from a pool of repair modules, wherein the one or more repair modules comprises information for correcting the one or more errors on the list, generating a set of commands for correcting the one or more errors on the list based on the information in the one or more repair modules, and repairing the policy by executing the set of commands to modify the information in the policy.

In another embodiment, the present disclosure provides a control computer comprising a communications circuit communicatively connecting the control computer to a computer network, and a processing circuit operatively connected to the communications circuit. The processing circuit is configured to determine that a policy has failed a validation process, wherein the policy comprises policy information associated with operating a computing device, identify a repair module that is preconfigured to correct an error in the policy information that caused the policy to fail the validation process based on a message communicated with the repair module, and repair the error in the policy information based on repair information received from the repair module.

In another embodiment, the present disclosure provides a computer readable storage medium comprising computer executable code stored thereon that, when executed by a processing circuit of a computing device, controls the computing device to identify a policy that has failed a validation process, wherein the policy comprises policy information associated with operating a computing device, select a repair module from among a plurality of repair modules stored in a memory based on a message received from the repair module, wherein the plurality of repair modules comprise repair information configured to correct corresponding errors in the policy, and apply the repair information in the selected repair module to the policy that failed the validation process.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIGS. 3A-3D illustrate coding for implementing the repair modules according to one embodiment.

DETAILED DESCRIPTION

Figure 1:
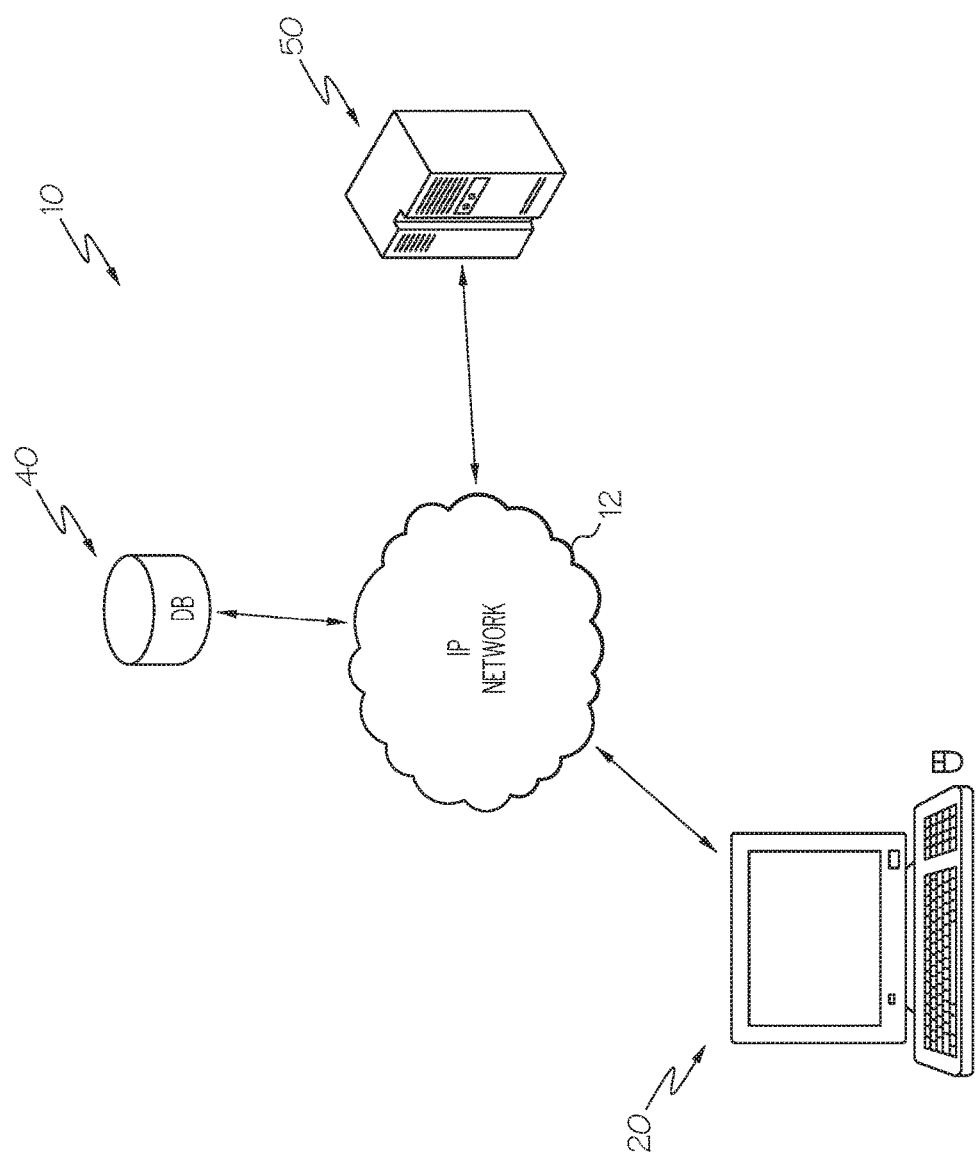
FIG. 1 is a functional block diagram illustrating some components of a computer network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a computing device, a computer-implemented method, and a corresponding computer-readable storage medium for repairing policies that fail a validation process. More particularly, the present disclosure provides a control computer configured to implement a multi-stage process that automatically repairs the errors contained in a given set of policies using one or more repair modules that are selected from a pool or store of repair modules. In a first stage, a control application executing on the control computer identifies the errors that caused one or more of the policies to fail a validation process. Those errors are then associated with a repair module that is selected from the pool of repair modules by the control application. The repair modules are selected based on the errors and comprise the information that is needed to correct or repair the errors.

In a second stage, the control application generates a corresponding "changeset" from the information in the selected repair modules. The "changeset" comprises a set of instructions or commands, and in some cases, data, that defines how the detected errors are to be resolved. In at least one embodiment, the changeset is implemented as a file in XML format.

In a third stage, the control application applies the generated set of commands and/or data to the policies that failed validation to correct the errors in those policies. Applying the generated set of commands in the third stage allows a user to review the set of commands that are generated, obtain approval to apply those commands, if required, and to schedule applying the commands at an appropriate time.

Turning now to the drawings, FIG. 1 is a functional block diagram illustrating some components of a computer system 10 configured according to one embodiment of the present disclosure. As seen in FIG. 1, system 10 comprises an IP network 12 that communicatively interconnects a control computer 20 with a data store, such as database (DB) 40, and one or more network-based computing devices, such as application server (AS) 50. Those of ordinary skill in the art will readily appreciate that the components illustrated in FIG. 1 are merely illustrative, and that systems such as system 10 may include more or fewer components as needed or desired.

The IP network 12 comprises, in at least one embodiment, a packet-based communications network that transfers data between the control computer 20, DB 40, and AS 50 in packets. The protocols required for supporting such communications across IP network 12 include the well-understood TCP/IP protocol. However, other protocols for transferring data between the components connected to IP network 12 may be employed in addition to, or in lieu of, TCP/IP as needed or desired. One example of a suitable IP network 12 for use with the embodiments of the present disclosure includes the Internet. However, as those of ordinary skill in the art will appreciate, any number and combination of public and/or private packet-based networks are suitable for use with the embodiments of the present disclosure.

The control computer 20 may comprise, for example, a user's desktop computer or laptop computer. However, the control computer 20 may also be a server computer, such as AS 50, that is accessed via a user's desktop or laptop computer. Control computer 20, as seen later in more detail, will typically comprise several components such as a keyboard, a mouse, and a display monitor, for example, for allowing a user to interact with applications programs executing on control computer 20, or on one or more ASs 50. In cases where the applications programs are executing on an application server such as AS 50, the control computer 20 and the AS 50 executing the applications programs may communicate data and instructions via signaling and messaging over the IP network 12, as is known in the art.

The control computer 20 may be utilized for any of a known variety of functions. In some cases, such operations are governed by one or more policies maintained in a "policy store." As previously described, policies may be embodied as one or more files and stored in any persistent storage needed or desired, such as databases and data repositories. Generally, the policies in the policy store are created and stored and do not change. However, there are times when a policy does change, such as when a customer or administrator, for example, needs to alter or update the policy. Often times, the customers and/or administrators inadvertently introduce the errors when they try to modify the policies to reflect such new or updated information. For example, these errors may be introduced when a user bypasses acceptable processes while modifying the policies, or by a network glitch. In some cases, the errors may be unintentionally introduced whenever someone attempts to manually alter another part of a system (e.g., the DB). Additionally, the errors may be caused by a power outage or some other equipment failure or problem occurring at some critical time.

However the errors are introduced, they are usually detected from time-to-time when the policies in the policy store are subject to a validation process. Such validation processes, which are well-known in the art, are executed to ensure that the policies adhere to a set of predetermined rules and/or contain certain information formatted according to a predetermined scheme.

According to embodiments of the present disclosure, the control computer 20 is configured to determine whether any of those policies have failed a validation process indicating that the policy is no longer valid. Such validation processes are generally well-known, and may be performed, for example, whenever the policy information that comprises a given policy has changed. The validation processes help to ensure that any modifications that are made to the policy information are proper and comport with a known pre-defined format.

Responsive to detecting that a policy has failed validation, the control computer 20 determines why the policy failed (e.g., by determining an error code of the error that caused validation failure), as well as how to correct the error. To accomplish this, the embodiments of the present disclosure are configured to utilize one or more repair modules. A repair module is a pluggable component designed to fix a particular defect and/or inconsistency in the policies. For example, a first repair module may be configured to correct, and be implemented, to fix an incorrect data schema, while another different repair module may be configured, and implemented, to fix a link or rule. Still other repair modules may be configured to fix invalid instances of certain objects.

Regardless of the error, however, the control computer 20, as described in more detail below, first identifies a repair module that is able to correct an error from the plurality of repair modules stored as a pool. The repair modules, as well as the policies undergoing validation, may be stored in one or more of a local memory circuit on control computer 20, at DB 40, and at AS 50. Each repair module in the pool is a file that comprises repair information specific to correcting a given error. The control computer 20 communicates error information about the error to the repair modules, and based on a response from the repair modules, identifies which of the repair modules are configured to correct the error. Those repair modules that indicate an ability to correct the specifically identified error are then selected by the control computer 20 and used to correct the error.

Figure 2:
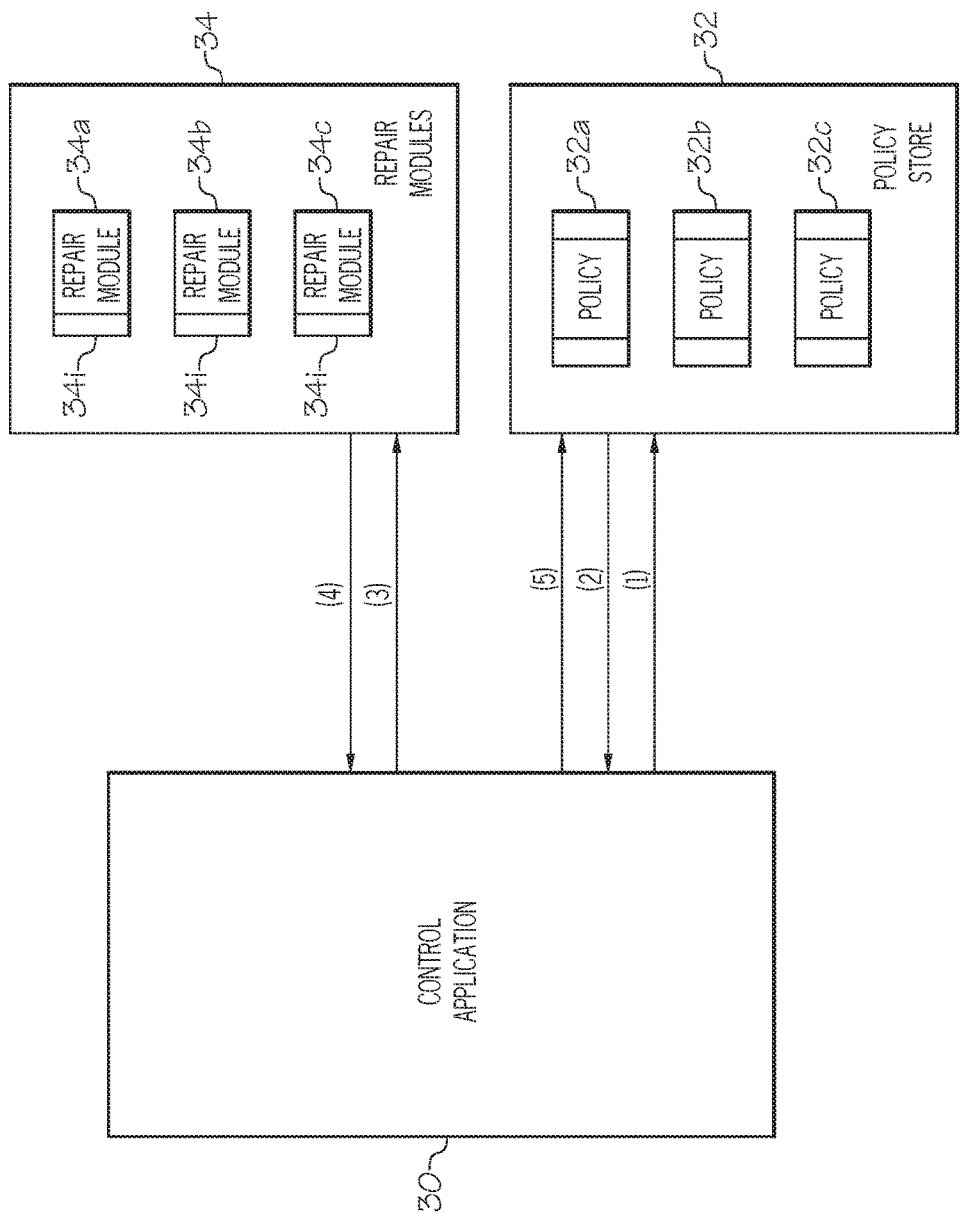
FIG. 2 is a functional block diagram illustrating communications between a control application executing on a processing circuit, the policies that either pass or fail a validation process, and the repair modules that are configured, according to one embodiment of the present disclosure, to repair those policies that fail the validation process.

FIG. 2 is a functional block diagram illustrating the messaging communications that exist between a control application 30 executing on the control computer 20, a policy store 32 comprising the policies that undergo the validation process, and a pool of repair modules 34 (i.e., the repair module store) that are used to repair the policies that fail the validation process. Similarly, the pool of repair modules 34 comprises a plurality of different repair modules 34*a*, 34*b*, 34*c*, each of which comprises repair information for correcting the policies that fail validation. As described in more detail below, the control application 30 communicates with one or more of the repair modules to determine which of them is able to correct the error that caused one or more of the policies 32 to fail. To facilitate such communications, each of the repair modules 34 comprises a respective communications interface 34*i*, implemented, for example, as an Application Programming Interface (API). Each communications interface 34*i* defines the functions that are needed by its corresponding repair module 34*a*, 34*b*, 34*c* to send and receive messages with the control application 30 regarding the errors that cause the policies to fail validation and the repair of those errors.

By way of example only, FIG. 2 illustrates the multi-stage process for correcting errors in a given policy or set of policies. In the first stage, the control application 30 determines which of the policies 32*a*, 32*b*, 32*c*, has failed a validation process (FIG. 2—Step 1). This may be accomplished, for example, by retrieving and analyzing the contents of a validation report (FIG. 2—Step 2) produced as output by the application program that performs the validation process. The report may comprise information associated with the error that caused the validation failure including, but not limited to, error codes, error identifiers, Uniform Resource Locators (URLs) associated with the policy that failed validation, and the like. The control application 30 then uses the error information to generate and send a request message to the pool of repair modules 34 (FIG. 2—Step 3) to determine which of those repair modules 34a, 34b, 34c, if any, is preconfigured to correct the particular error identified in the request message. By way of example only, the control application 30 may query each individual repair module 34a, 34b, 34c by invoking a function defined in the interface 34i of each individual repair module 34a, 34b, 34c. The call invoking the function could include, for example, an error object that particularly identifies the error code that caused the policy to fail the validation process.

Upon receipt of the request, each repair module 34a, 34b, 34c would compare the error code received from the control application 30 to its own data identifying which error codes it is configured to correct, and generate and send a response message back to the control application 30 indicating the results of that comparison. Particularly, if based on the comparison a given repair module 34a, 34b, 34c determines that it is able to correct errors of the type identified in the received request message, that repair module 34a, 34b, 34c would return a response message indicating as much.

In the second stage, which is described in more detail below, the repair module 34a, 34b, 34c generates the information needed to repair the error, and then provides that information to the control application 30 (FIG. 2—Step 4). The information needed to repair the error may be generated by the repair modules 34a, 34b, 34c autonomously responsive to determining whether it can correct the error, or in response to an explicit request from the control application 30 to generate the information. In this latter case, the repair module 34a, 34b, 34c may first send back an indication to the control application 30, which would then issue another request to generate the information. Regardless of how the information is generated and provided to the control application 30, however, the control application 30 would use the information generated by the repair module 34a, 34b, 34c in a third stage to correct the error(s) in the policies that failed validation (FIG. 2—Step 5).

In some cases, approval to make the changes may be needed, but is not required, from a manager, customer, or other personnel. In such cases, approval may be obtained before repairing the error(s) in the policy or policies by submitting the repair information for correcting the error to an appropriate manager, for example. As described in more detail below, the procedure for approval may entail reviewing and testing the changes defined by the information generated by the repair module 34a, 34b, 34c in a lab or test environment. In some cases, prompts may be provided for an operator performing the review and approval process to clarify certain information and/or provide additional information. However, once approved, the changes defined by the information received from the repair module are applied to the policy or policies for production.

FIGS. 3A-3D illustrate programming code that may be employed to implement the repair modules 34 described herein according to embodiments of the present disclosure. Those of ordinary skill in the art will appreciate that the particular coding seen in these Figures illustrates only one possible implementation. Thus, the coding seen in these Figures, and discussed throughout the disclosure, is exemplary only and is used simply for illustrative purposes. There may be other implementations of the coding used to implement the repair modules 34 as needed or desired.

To implement a repair module, as seen in FIGS. 3A-3D, a RepairModuleFactory interface is implemented. The RepairModuleFactory interface (FIG. 3A) comprises two methods—create( ) and canRepair( ). The create( ) method, when invoked, creates the repair module that will contain the repair information that is used to correct the errors. The canRepair(Error) method returns an indication of whether the repair module is able to correct a given error identified by the "Error" parameter. As described in more detail later, the Error parameter is an object that may comprise various data and information used to identify the particular error or errors that caused the verification failure. For example, in one embodiment, the Error parameter comprises a parameter that identifies the particular invalid object (e.g., error_id) that caused the verification failure, as well as what particular attribute of the object is invalid. In some cases, the error parameter may also comprise additional information that may be required to analyze the error.

In this embodiment, however, the canRepair( ) method returns a Boolean "TRUE" or "FALSE" depending on whether the repair module is configured to correct the error identified by the Error parameter. However, as seen in more detail below, this method may return other values and/or indicate its ability to correct a given identified error in other ways as well.

The RepairModuleFactory is a singleton which automatically registers itself on construction with a "RepairManager" by calling function registerRepairModule( ), as seen in FIG. 3A. The RepairManager interfaces communicatively with the control application 30, handles all the repair modules, maintains a list of all RepairModuleFactory Instances, and orchestrates the repair process.

In operation, the RepairManager gathers all the errors in the policies 32 by calling, for example, a predefined validation process. This process may be initiated by the Repair-Manager responsive to receiving a command from the control application 30, for example, or may be executed autonomously by the RepairManager as needed or desired. Once all the errors are gathered, the RepairManager would iterate through all errors. For each error, the RepairManager determines which repair module 34a, 34b, 34c can fix the error by calling the RepairModuleFactory's canRepair( ) method. The result is a list of errors that caused the policies to fail validation, with each error being mapped or "grouped" to the particular one or more repair modules that are able to correct them. Then, to correct the errors on the list, the RepairManager invokes the RepairModule.doDefaultRepair ( ) function of each selected repair module (FIG. 3D). Invoking this function generates a text file describing all the errors and suggested repairs. Additionally, this function calls the addChange( ) function of the XPSChangeSet class (see FIG. 3C) for each repair that results in the generation of an XML file comprising the repair instructions required for modifying the failed policies to correct the errors. These repair instructions are later applied to the policies that failed validation by using, for example, the apply( ) function of the XPSChangeSet class (FIG. 3C). In this embodiment, for example, applying the repair instructions is performed using a separate process executed by the computing device 30. Further, the repair instructions may be optionally submitted for a review and testing process in a lab environment before being applied to the policies.

As previously stated, embodiments of the present disclosure invoke the RepairModuleFactory's canRepair( ) method to determine whether a given repair module 34a, 34b, 34c is able to correct a given error. As such, the canRepair( ) method accepts the Error parameter object as a parameter. As above, the Error parameter object may comprise any type of information about the error as needed or desired; however, some examples of suitable information include, but are not limited to, information that identifies the particular error itself (e.g., a Rule, a Policy, etc.), an error ID, a link to the policy or error, if appropriate, and a copy of the parameters passed to a validation warning function (e.g., xValidationWarning( )) that notifies a user whenever a given policy has failed validation. However, regardless of the particular information that comprises the Error parameter object, the canRepair( ) method utilizes this error information to determine whether it can, or cannot, correct the error.

In some embodiments, the Error parameter object passed to the repair module comprises a state indicator to indicate its current state. In such cases, the repair modules may also be configured to change the state indicator based on whether they are able to correct a given error, and return that information to the RepairManager. By way of example only, such state indicators may comprise a fixed value indicating one of STATE_ACCEPTED_FOR_FIXING, STATE_NOT_FIXED, STATE_FULLY_FIXED, and STATE_PARTIALLY_FIXED. The ability to change the state indicator in the Error parameter object allows the Repair Manager to determine whether the repair module can correct the error, as well as the extent to which the error may be fixed (e.g., partially, fully, or not at all). Such information may be utilized, for example, when grouping the errors to repair modules.

Additionally, the RepairManager is able, in some embodiments, to prioritize the order in which the repair modules should be invoked to correct an error. For example, some repair modules may be able to correct the same error. In these cases, each of the canRepair( ) methods associated with the various repair modules may return a priority indicator (e.g., high, medium, low) to indicate how critical correcting this particular error is. Then, to correct the error, the repair modules would then be invoked in the prioritized order.

According to the present embodiments, there are multiple ways to associate a RepairModuleFactory with a specific error—e.g., by using an error ID (FIG. 3B), or by implementing the canRepair( ) method (FIG. 3A). The canRepair( ) method checks that the object types identified in the Error parameter object match the object types that it is able to repair. The method returns "TRUE" (or a similar value or indication) if it is able to repair the error, and "FALSE" if it not able to repair the error. In these latter cases, the RepairManager would try the next registered RepairModuleFactory to determine whether any of those repair modules are able to repair the error.

Another way to associate a RepairModuleFactory with a specific error is by using the error ID of the error that caused the failure in the validation process. In these embodiments, the RepairManager calls the RepairModuleFactory to provide a repair module whenever a certain error ID is detected. This type of registration is achieved by having the class RepairModulesFactory class inherit from the RepairModuleFactoryForMsgld class seen in FIG. 3B. This will create a default canRepair( ) method that compares the error IDs of a current error against its own data, and return TRUE if they match and FALSE if they do not match.

As stated above, there are other ways to implement the repair functions of the present disclosure. For example, the previous embodiments utilize the RepairModuleFactory class to create a repair module, as well as to determine whether a particular repair module is able to repair a given error. However, the RepairModuleFactory class is not required in some embodiments. Rather, the RepairModule class may be implemented without the RepairModuleFactory class. In these latter embodiments, the RepairModule class would comprise the canRepair( ) function required for determining whether a given error could be corrected, as well as the doDefaultRepair( ) function for correcting those errors.

Figure 4:
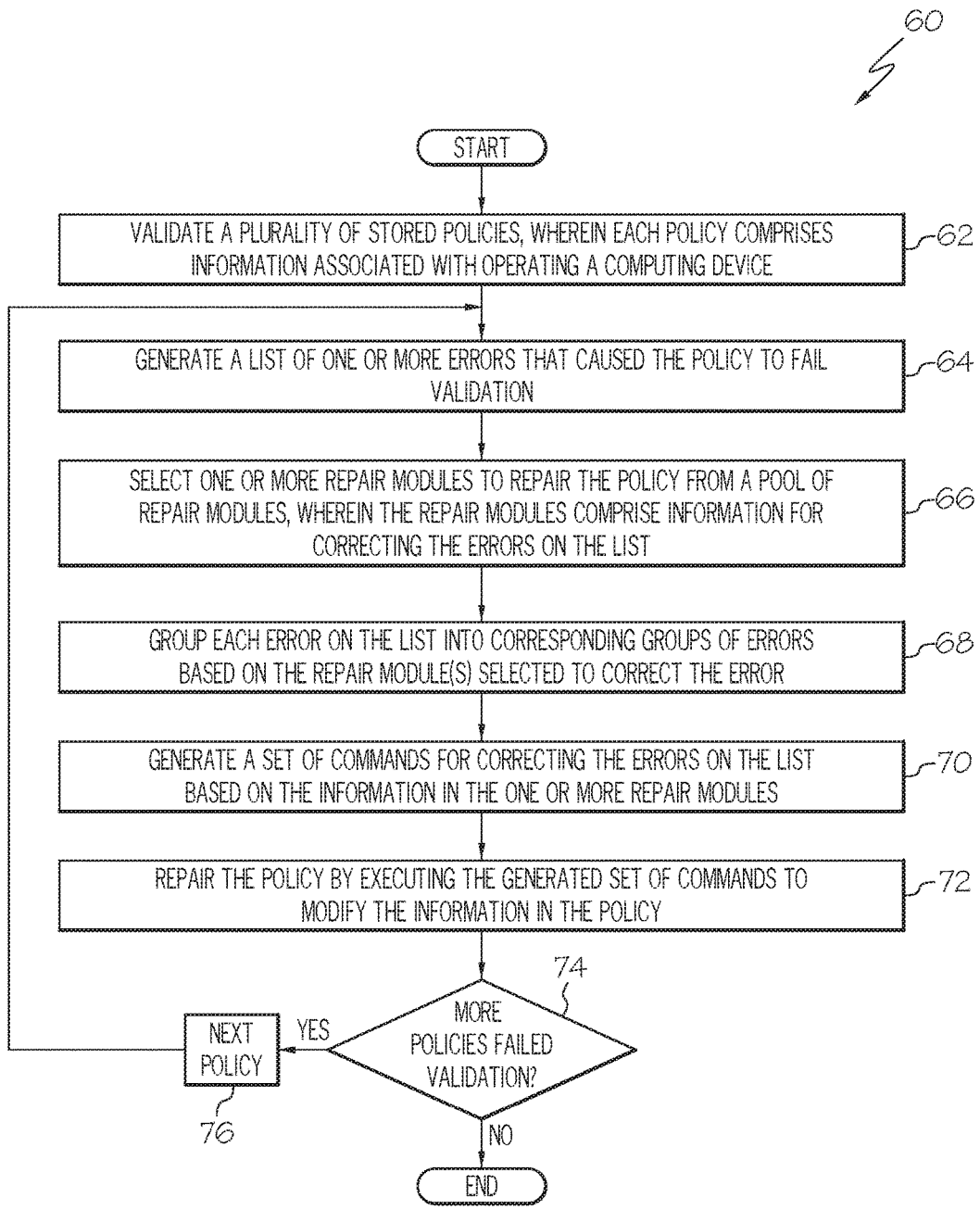
FIG. 4 is a flow diagram illustrating a method for repairing policies, according to one embodiment of the present disclosure, that fail a validation process.

FIG. 4 is a flow diagram illustrating a method 60 for repairing policies that fail a validation process, according to one embodiment of the present disclosure. As seen in FIG. 4, method 60 begins with validating each of the plurality of policies that are stored in the policy pool (box 62). As previously stated, each policy comprises information that is associated with operating a computing device and/or a network (e.g., a user policy, an access policy, a security policy, etc.). There are various ways to verify the policies, however, in one embodiment, the control application 30, for example, executes the XPSSweeper utility to verify the integrity of the policy information stored in each policy in the policy store.

The policy validation process typically outputs an integrity report that identifies whether each policy passed or failed validation. Therefore, in one embodiment, the control application 30 analyzes this report and generates a list of the errors that caused the policies to fail validation (box 64). Then, using the error codes and/or other information, control application 30 selects one of more of the repair modules to repair the policies that failed validation (box 66). Each error may be grouped in accordance with the particular repair module that is selected to correct it (box 68), and a set of commands for correcting the errors is generated (box 70). The set of commands is generated by the control application 30, for example, based on the information that is contained within the selected repair modules. In another embodiment, however, the control application 30 receives the set of commands from the repair module itself. Regardless of how the commands are generated, however, the control application 30 repairs the policies that failed validation by executing the set of commands (box 72). Such execution, in one embodiment, modifies the policy information contained in the policies by replacing incorrect or invalid policy information with updated policy information. Method 60 is then repeated for each policy in the policy store that failed validation (boxes 74, 76).

Figure 5:
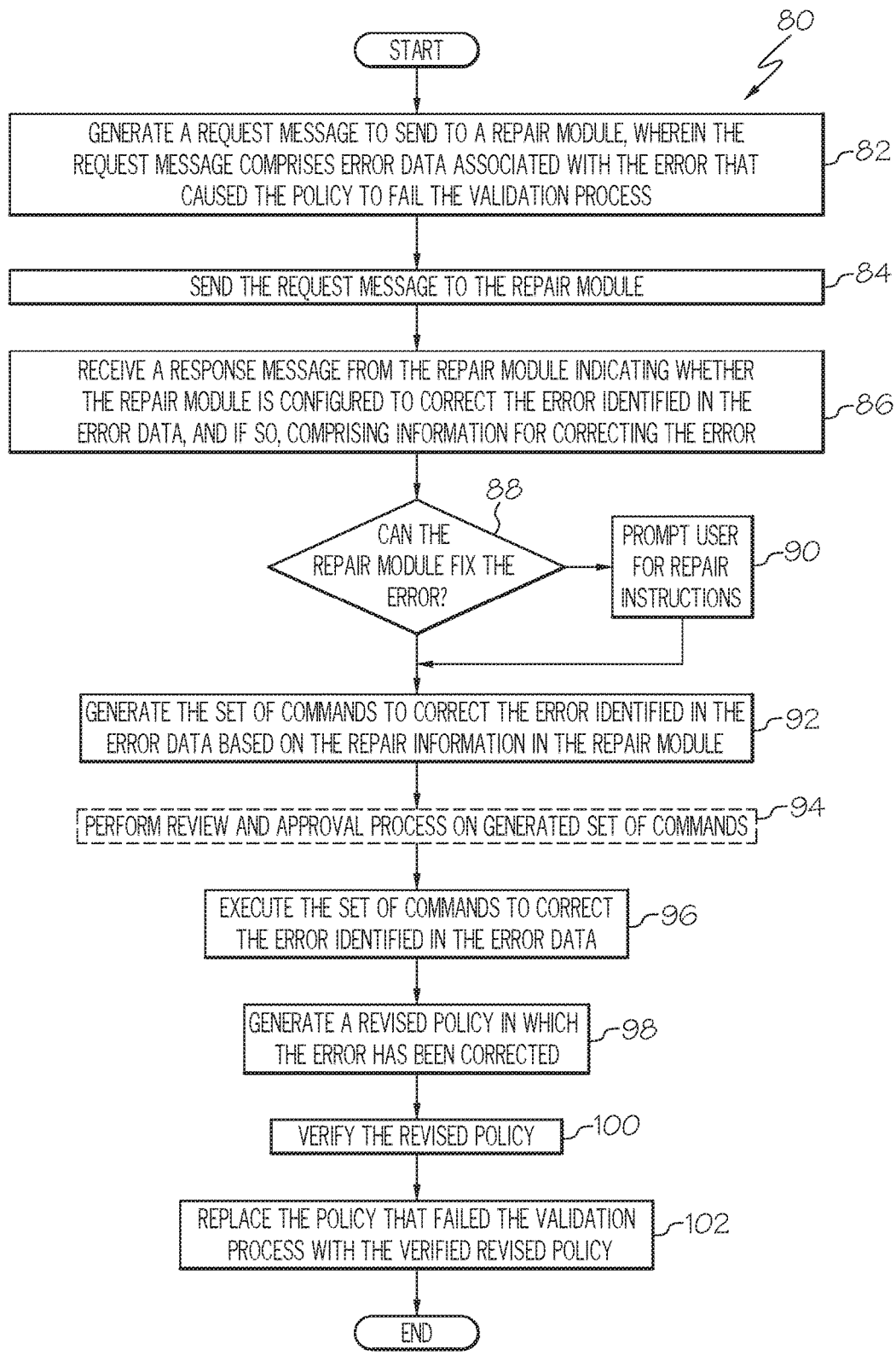
FIG. 5 is a flow diagram illustrating a method for repairing policies, according to another embodiment of the present disclosure, that fail a validation process.

FIG. 5 is a flow diagram illustrating a method 80 for repairing policies according to another embodiment of the present disclosure. It should be noted that method 80 assumes that the policies have already passed or failed a validation process, and that the list of errors causing the failures has been generated.

Method 80 begins with the control application generating a request message to send to a repair module (box 82). The request message may comprise any information needed or desired, but in one embodiment, comprises error information associated with the error that caused the policy to fail validation. The control application 30 then sends the request message to the repair module (box 84), as previously described, and receives a response message from the repair module indicating whether it is able to correct the error (box 86). In some embodiments, the response message may also comprise the information needed for effecting repairs to the policy information.

If the repair module indicates that it cannot repair the error (box 88), one embodiment of the present disclosure generates a prompt for display to the user that requests instructions for repairing the error (box 90). However, if the repair module indicates that it can repair the error (box 88), the control application generated the set of commands needed to correct the error based on the repair information maintained in the repair module (box 92). As previously stated, the set of commands may be created by the control application 30 using the repair information returned by the repair module. Alternatively, however, the control application 30 may simply receive the set of commands needed to repair the error from the repair module. In some embodiments, the control application 30 may generate some of the commands, while receiving other commands from the repair module. However, regardless of how the set of commands are generated, they may be passed to a systems operator, for example, to undergo a review and approval process (box 94). Such a process, while optional, allows the systems operator to first test the generated set of commands in a laboratory or test environment. Particularly, the set of commands may first be tested "off-line" on some equipment under a test scenario to determine whether the set of commands will correct the error(s). If not, the process may be repeated and/or additional information obtained for use in generating the set of commands. Once the tests are deemed successful, the set of commands can be applied in a production environment.

The set of commands is, in one embodiment, a set of XML commands that may include data. These commands are then executed to correct the error or errors that caused the validation failure (box 96). In one embodiment, for example, executing the set of commands generates a new policy having corrected policy information (box 98). In other embodiments, however, executing the commands modifies the policy information in the existing policy. Regardless of how the policy is corrected, though, the control application 30 will verify the revised policy (box 100), and if required, replace the existing policy that failed the validation process with the new policy that passed the validation process (box 102).

Figure 6:
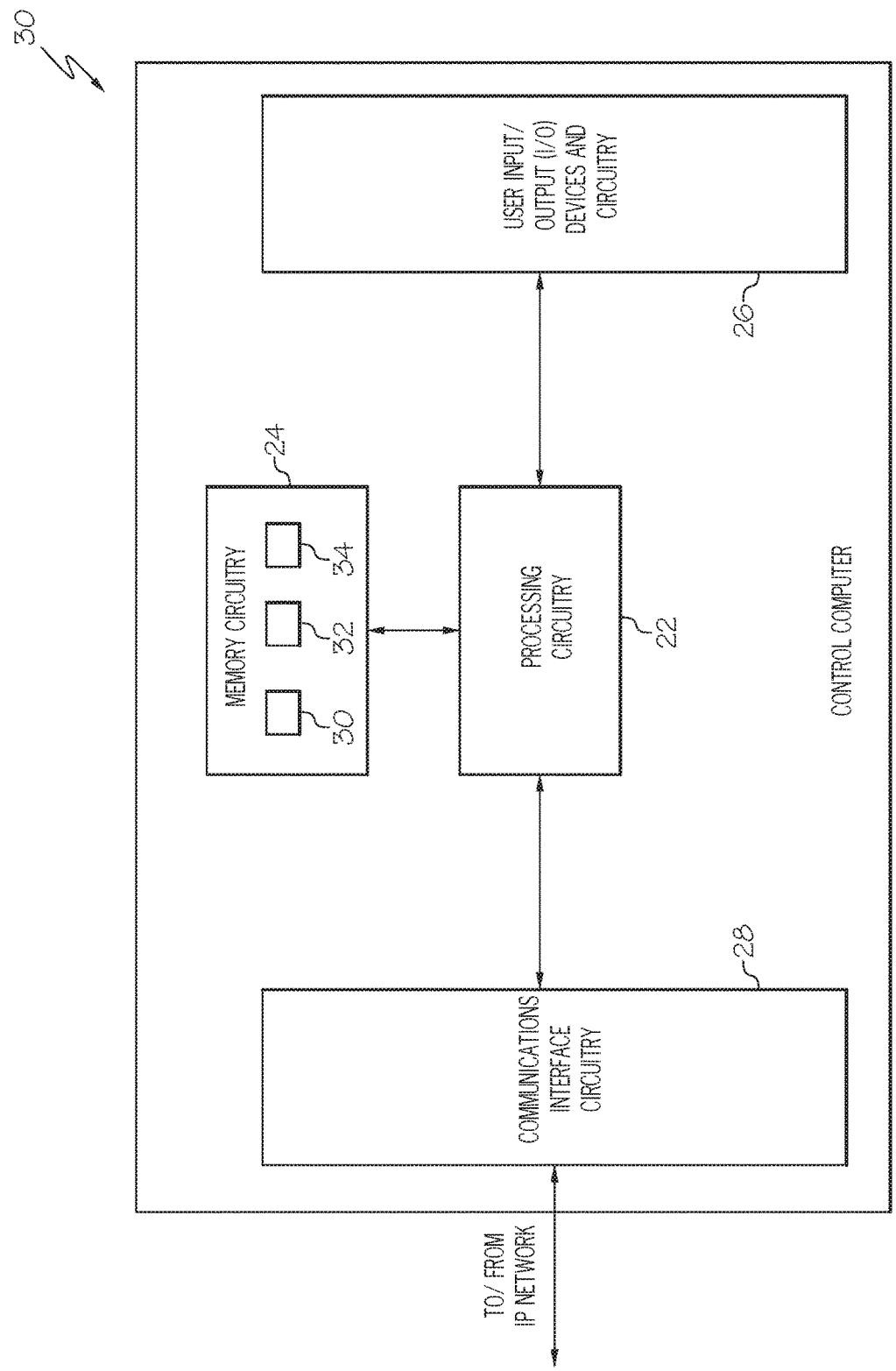
FIG. 6 is a block diagram illustrating some of the functional components of a computing device configured to repair policies, according to one embodiment of the present disclosure, that fail a validation process.

FIG. 6 is a block diagram illustrating some of the functional components of a computing device configured to repair policies, according to one embodiment of the present disclosure, that fail a validation process. As seen in FIG. 6, control computer 20 comprises, inter alia, a processing circuit 22, a memory circuit 24, a user Input/Output (I/O) interface 26, and a communications interface circuit 28. Those skilled in the art will readily appreciate that control computer 20 is not limited solely to the components seen in the figure, but rather, may comprise other hardware and/or software components as needed or desired.

Processing circuit 22 may be implemented by hardware circuitry comprising one or more microprocessors, hardware, firmware, or a combination thereof. Generally, processing circuit 22 controls the operation and functions of the control computer 20 according to appropriate standards. Such operations and functions include, but are not limited to, communicating with other network devices, such as DB 40 and/or AS 50 via network 12.

Additionally, according to various embodiments of the present disclosure, processing circuit 22 is configured to determine which policy or policies have failed a validation process, identify the errors that caused those policy or policies to fail the validation process, and to invoke selected repair modules to correct those errors, as previously described. To that end, the processing circuit 22 may be configured to implement the control application 30 stored in memory circuit 24 that comprises the logic and instructions needed to perform embodiments of the present disclosure as previously described. The control application 30 may comprise a standalone application program that invokes and/or interfaces with one or more other utility application programs to perform the embodiments of the present disclosure. However, control application 30 may comprise one of the utility programs (e.g., XPSSweeper) specially configured to perform the embodiments of the present disclosure.

Memory circuit 24 may comprise any non-transitory, solid state memory or computer readable storage media known in the art. Suitable examples of such media include, but are not limited to, ROM, DRAM, Flash, or a device capable of reading computer-readable storage media, such as optical or magnetic storage media. Memory circuit 24 stores programs and instructions, such as the control application 30 previously mentioned, that configures the processing circuit 22 to perform the method of the present disclosure as described in the previous embodiments. In addition, however, the memory circuit may, in at least some embodiments, store one or both of the policies in the policy store 32 and the repair modules 34.

The user I/O interface 26 comprises the hardware and software components necessary for a user to interact with control computer 20. Such components include, but are not limited to, a display device that displays user prompts to provide information, as previously described, as well as a keyboard, a mouse, and any other input/output mechanisms that facilitate the ability of the user to input repair information and/or interact with the control application 30 according to embodiments of the present disclosure.

The communications interface circuit 28 may comprise, for example, an I/O card or other interface circuit configured to communicate data and information with DB 40 and AS 50 via network 12. As those of ordinary skill in the art will readily appreciate, the communications interface circuit 28 may communicate with these and other entities using any known protocol needed or desired. In one embodiment, however, communications interface circuit 28 sends data to and receives data from DB 40 and AS 50 in data packets according to the well-known ETHERNET protocol. In this regard, communications interface circuit 28 may comprise an ETHERNET card.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
validating, by a control application executing on a computer system, a plurality of stored policies for a computer network, each policy including information associated with operating one or more computing devices within the computer network; and
for each policy that fails validation:
generating, by the control application, a list of one or more errors that caused the policy to fail validation;
sending, by the control application, to a pool of repair modules, the list of one or more errors, wherein each repair module of the pool is executable by the computer system to:
identify a respective error that the repair module is preconfigured to correct; and provide information for correcting the respective error;
receiving, by the control application from one or more repair modules of the pool:
an indication that the one or more repair modules are preconfigured to correct the one or more errors on the list; and
information for correcting the one or more errors on the list;
generating, by the control application, a set of commands for correcting the one or more errors on the list based on the information received from the one or more repair modules; and
initiating, by the control application, repairs to the policy, wherein repairing the policy includes executing the set of commands to modify the information in the policy.

2. The computer-implemented method of claim 1, further comprising grouping each of the one or more errors in the list based on identifying which of the pool of repair modules is preconfigured to correct each of the one or more errors.

3. The computer-implemented method of claim 2, wherein generating the set of commands for correcting the one or more errors on the list comprises generating a corresponding set of commands for each group of one or more errors, and wherein repairing the policy comprises executing each corresponding set of commands.

4. The computer-implemented method of claim 1, wherein the plurality of stored policies includes at least one security policy.

5. The computer-implemented method of claim 1, wherein generating the set of commands for correcting the one or more errors on the list based on the information received from the one or more repair modules comprises receiving the set of commands from the one or more repair modules.

6. The computer-implemented method of claim 1, further comprising generating a user prompt requesting input from a user for correcting a given error if none of the pool of repair modules are preconfigured to correct the given error.

7. The computer-implemented method of claim 1, further comprising verifying the repaired policy by repeating the validating subsequent to modifying the information in the policy.

8. A control computer comprising:
a communications circuit communicatively connecting the control computer to a computer network; and
a processing circuit operatively connected to the communications circuit and configured to:
determine that a policy has failed a validation process and generate a list of one or more errors that caused the policy to fail, wherein the policy includes policy information associated with operating a computing device;
send the list to a repair module that is preconfigured to correct at least one error in the list;
receive repair information for correcting the at least one error on the list from the repair module;
generate a set of commands for correcting the at least one error based on the received repair information; and
repair the at least one error in the policy information by executing the set of commands.

9. The control computer of claim 8, wherein the processing circuit is further configured to:
determine that the policy failed the validation process in a first processing stage; and
send the list to the repair module that is preconfigured to correct the at least one error in a second processing stage; and
execute the set of commands to repair the at least one error, in a third processing stage.

10. The control computer of claim 8, wherein the processing circuit is further configured to send the list to a plurality of repair modules stored in a memory.

11. The control computer of claim 8, wherein to identify the repair module, the processing circuit is further configured to:
generate a request message comprising error information associated with the list of one or more errors;
send the request message to the repair module;
receive a response message from the repair module including an indication of whether the repair module is preconfigured to correct the at least one error; and
identify the repair module as being configured to correct the at least one error based on the indication in the response message.

12. The control computer of claim 11, wherein the list of one or more errors includes an error object for each of the one or more errors that identifies a corresponding error that caused the policy to fail the validation process.

13. The control computer of claim 8, wherein the processing circuit is further configured to group the one or more errors that caused the policy to fail the validation process into one or more error groups.

14. The control computer of claim 8, wherein to repair the at least one error in the policy information, the processing circuit is further configured to execute a set of commands that correct the at least one error.

15. The control computer of claim 14, wherein the policy is a routing policy.

16. The control computer of claim 8, wherein the repair information received from the repair module includes the set of commands that are executed by the processing circuit.

17. The control computer of claim 8, wherein the processing circuit is further configured to:
  generate a revised policy based on executing the set of commands, wherein the revised policy includes repaired policy information;
  verify the revised policy using the validation process; and
  replace the policy that failed the validation process with the verified revised policy.

18. A computer readable storage medium comprising computer executable code stored thereon that is executable to cause a computing device to perform operations comprising:
  identify identifying a policy that has failed a validation process, wherein the policy includes policy information associated with operating a computing device;
  generating a list of one or more errors in the policy information that caused the policy to fail;
  sending the list to a plurality of repair modules stored in a memory, wherein the plurality of repair modules include repair information configured to correct corresponding errors in the policy;
  receiving from one or more repair modules of the plurality of repair modules:
    an indication that the one or more repair modules include repair information to correct the one or more errors on the list; and
    information for correcting the one or more errors on the list;
  generating a set of commands for correcting the one or more errors based on the information received from the one or more repair modules; and
  initiating repairs to the policy that failed the validation process, wherein repairing the policy includes executing the set of commands to modify the information in the policy.

* * * * *